United States Patent
Steinert

(10) Patent No.: US 6,849,205 B2
(45) Date of Patent: Feb. 1, 2005

(54) USE OF ADDITIVE COMBINATIONS FOR PREVENTING SKIN FORMATION ON AIR-DRYING LACQUERS

(75) Inventor: Andreas Steinert, Langenfeld (DE)

(73) Assignee: Borchers GmbH, Monheim (DE)

( * ) Notice: Subject to any disclaimer, the term of this patent is extended or adjusted under 35 U.S.C. 154(b) by 25 days.

(21) Appl. No.: 10/220,327

(22) PCT Filed: Feb. 21, 2001

(86) PCT No.: PCT/EP01/01922

§ 371 (c)(1),
(2), (4) Date: Aug. 29, 2002

(87) PCT Pub. No.: WO01/64795

PCT Pub. Date: Sep. 7, 2001

(65) Prior Publication Data

US 2003/0047112 A1 Mar. 13, 2003

(30) Foreign Application Priority Data

Mar. 3, 2000 (DE) ......................... 100 10 427

(51) Int. Cl.⁷ .................. C09K 15/16; C09K 15/20; C09K 15/06; C09D 7/04
(52) U.S. Cl. .................. 252/401; 252/403; 252/407; 106/263
(58) Field of Search ................ 252/401, 403, 252/407; 106/263

(56) References Cited

U.S. PATENT DOCUMENTS

| | | | |
|---|---|---|---|
| 3,259,511 A | | 7/1966 | Rairdon et al. ............. 106/263 |
| 5,128,396 A | * | 7/1992 | O'Neil et al. ................ 524/288 |
| 5,183,842 A | * | 2/1993 | O'Neil et al. ................ 524/288 |
| 5,916,930 A | * | 6/1999 | Gaglani et al. ............. 523/122 |
| 5,985,018 A | * | 11/1999 | Link et al. ............. 106/287.25 |

FOREIGN PATENT DOCUMENTS

| | | |
|---|---|---|
| EP | 903 380 | 3/1999 |
| WO | 00/11090 | 3/2000 |

* cited by examiner

Primary Examiner—Joseph D. Anthony

(74) Attorney, Agent, or Firm—Diderico van Eyl; Godfried R. Akorli

(57) ABSTRACT

The present invention relates to a coating composition containing an oxidatively drying binder and, as anti-skinning agents, a mixture of A) an aliphatic amine corresponding to formula (Ia) and/or its salts corresponding to formula (Ib):

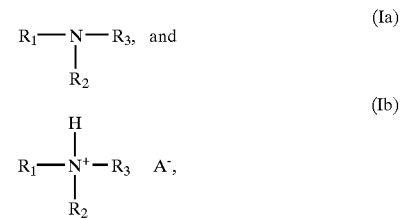

wherein
$R_1$, $R_2$ and $R_3$ each independently of the others represents hydrogen (H); a linear or branched $C_1$–$C_{20}$-alkyl radical which is optionally unsaturated or which is optionally mono- or poly-substituted by a hydroxyl radical, an alkoxy radical, an amine radical corresponding to the formula $N(R_1)(R_2)$, or a $C_5$–$C_7$-cycloalkyl radical, and
$A^-$ represents a salt-forming anion, and B) with a compound corresponding to formula (II)

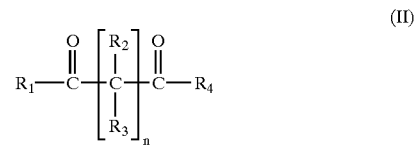

wherein
$R_1$ and $R_4$ each independently of the other represents hydrogen (H), a $C_1$–$C_4$-alkyl radical, a $C_6$–$C_{24}$-aryl radical or a $C_5$–$C_7$-cycloalkyl radical, a hydroxyl radical or a $C_1$–$C_4$-alkoxy radical, —O⁻ (oxygen anion),
$R_2$ represents H, a $C_1$–$C_4$-alkyl radical, or $A^-$ (anion),
$R_3$ represents H, a $C_1$–$C_4$-alkyl radical, and
n represents 0, 1 or 2.

7 Claims, No Drawings

USE OF ADDITIVE COMBINATIONS FOR PREVENTING SKIN FORMATION ON AIR-DRYING LACQUERS

BACKGROUND OF THE INVENTION

The invention relates to the use of additive combinations which are suitable for avoiding undesired skin formation in lacquer systems that dry by oxidation, and for improving the through-drying of the lacquer films.

The additives used according to the invention are characterised by the presence of primary, secondary or tertiary aliphatic amines and/or mixtures thereof in combination with dicarbonyl compounds.

The invention is in the field of colourless and pigmented lacquers and paints which dry by oxidation and are based on oils which dry by oxidation, alkyd resins, epoxy esters and other, refined oils which dry by oxidation, as well as in the field of printing inks. It relates to novel additives which are capable of delaying skin formation in the above-mentioned lacquer systems. Such additive systems are additionally capable of improving the through-drying and the flow of the lacquer systems.

Oils and binders which crosslink by oxidation by the action of oxygen (preferably atmospheric oxygen) by means of the addition of drying agents, for example metal carboxylates of transition metals, and as a result form a solid binder film may form a skin on their surface when they are stored in open or closed containers. That crosslinking, which takes place even before the product is actually used, is undesirable to a large degree and should therefore be avoided, because it renders handling of the lacquer, for example, more difficult and impairs uniform distribution of the siccatives. The accumulation and incorporation of the siccatives that are necessary for drying in the lacquer skin that forms can lead to significant delays in the drying of the lacquer on application.

Skin formation is also disadvantageous and therefore undesirable in the case of the applied lacquer film. Too rapid drying of the lacquer surface prevents uniform through-drying of the lower film layers by shielding them from the oxygen that is necessary for drying, which is unable sufficiently to penetrate the lacquer film and be distributed therein owing to too rapid drying at the surface. Disturbances in the flow of the lacquer film, for example adhesion problems or films which are not sufficiently hard, may result.

It is therefore state of the art to add to the lacquer organic substances which inhibit the reaction of the siccative metal with (atmospheric) oxygen. This can be effected both by binding of the oxygen and by complexing of the siccative metal. That object is achieved in the art mostly by the addition of oximes (especially butanoneoxime) or suitable phenolic compounds. A list of such known compounds will be found, for example, in H. Kittel "Lehrbuch der Lacke und Beschichtungen", Colomb Verlag 1976; J. Bieleman "Lack-additive" Wiley VCH 1998; Römpp Lexikon "Lacke und Druckfarben", Thieme Verlag 1998. In WO 00/11090, pyrazoles are recommended for that purpose.

However, phenolic anti-skinning agents markedly delay the onset of drying, so that they are suitable only for specific lacquer formulations. Oximes, on the other hand, such as, for example, methyl ethyl ketoxime or butyraldoxime, delay the onset of drying only slightly owing to their volatility. The most important disadvantage of oximes, which are nowadays used on a large scale, is their toxicity. For example, in a long-term inhalation study on rats and mice, an increased occurrence of liver tumours was observed following exposure to butanoneoxime, on the basis of which the German MAK (maximum concentration at the workplace) commission has classified the substance as a category 2 carcinogen (MAK-Liste 1997). For the user, the result is that complicated personal protective measures must be maintained when processing lacquers containing oximes as anti-skinning agents.

Accordingly, the object of the present invention was to provide anti-oxidants (anti-skinning agents) which prevent skin formation on lacquers over a long period of time and which do not delay the onset of drying, or delay it only very slightly. In addition, the resulting film hardnesses should not be adversely affected, and the products should have no disadvantageous toxicological properties.

A further object of the present Application was to prepare anti-skinning agents which can be incorporated into many different lacquers that dry by oxidation and which, on the basis of their physical properties, can be used without difficulty and widely in corresponding lacquer formulations.

SUMMARY OF THE INVENTION

Accordingly, the invention relates to the use of mixtures, described hereinbelow, of aliphatic amines of the general formula (Ia) and/or their salts of formula (Ib):

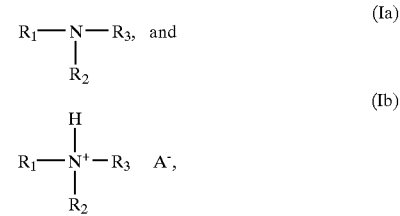

in which the radicals $R_1$, $R_2$ and $R_3$ each independently of the others represents hydrogen (H), linear or branched $C_1$–$C_{20}$-alkyl radical which is optionally unsaturated, optionally mono- or poly-substituted preferably by hydroxyl, alkoxy or amine radical or $C_5$–$_7$-cycloalkyl radical; the amine radical optionally also being substituted as described, and $A^-$ represents a salt-forming anion, with compounds of formula (II)

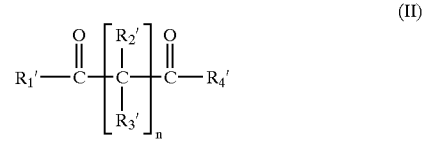

in which the radicals $R_1'$ and $R_4'$, each independently of the other represents hydrogen (H), $C_1$–$C_4$-alkyl radical, $C_6$–$C_{24}$-aryl radical or $C_5$–$C_7$-cycloalkyl radical, hydroxy radical or $C_1$–$C_4$-alkoxy radical, —O⁻(oxygen anion), and if present: $R_2'$, represents H, $C_1$–$C_4$-alkyl radical, $A^-$ (anion)

if present: $R_3'$, represents H, $C_1$–$C_4$-alkyl radical, and n represents 0, 1 or 2, as anti-skinning agents in lacquers that dry by oxidation.

DETAILED DESCRIPTION OF THE INVENTION

According to the invention there may be used as the salt-forming anion $A^-$ halides—such as chloride, bromide, iodide—sulfates such as ½ $SO_4^{2-}$, carboxylates such as acetate, butyrate, lactate, etc. In the case of the use according to the invention, it is also possible for the salt-forming anions $A^-$ to form in situ from the constituents of the mixture. The salt-forming anion $A^-$ is thus formed, for example, from a compound of formula (II) shown.

Within the scope of the invention, mixtures of compounds of the general formulae (Ia), (Ib) and (II) are used alone or in the form of solutions in water and/or organic solvents. All conventional solvents, for example aromatic compounds, white spirit, ketones and alcohols, can be used.

For use, the novel anti-skinning agents of the general formulae (Ia), (Ib) and (II) may be used in any desired admixture with one another. They are preferably used in the ratio (Ia)+(Ib):(II)=from 0.01:10 to 10:0.01 wt. %. They may be used in pure form or in the form of solutions in organic solvents or, alternatively, in the form of an aqueous dispersion or emulsion, aqueous in this connection being understood to mean that water is either the only solvent or is added in an amount of over 50 wt. %, based on the solvent mixture, together with conventional organic solvents (e.g. alcohols).

The amount of the additives employed according to the invention that is used is dependent primarily on the amount of siccatives used in the lacquer formulation. In general, approximately from 1 to 16 moles of mixtures of the compounds of formulae (Ia), (Ib) and (II) are to be added per mole of metal used in the primary drier or primary driers. Preference is given to the use of equimolar mixtures of compounds of formulae (Ia), (Ib) and (II), but it is also possible to use the compounds according to the invention in any other relative proportions. The particular preferred amounts to be used are dependent also on the nature of the binder and of the pigments used. Accordingly, especially preferred amounts in the case of unpigmented lacquers based on long-oil alkyd resins are, for example, from 3 to 9 moles of a compound of formula (Ia) and/or (Ib) in a mixture with from 3 to 9 moles of a compound of formula (II), based on the amount of metal used in the primary drier. In particular systems, the relative amount of additive to be used may even be greater than 16 moles of the mixture according to the invention (based on the amount of metal in the siccative).

It is an advantage of the anti-skinning agents according to the invention that, in a wide range of binders and when different siccatives are used, they reliably prevent skin formation without adversely affecting other drying properties of the lacquer.

EMBODIMENTS

The following embodiments of the mixtures of compounds of formulae (Ia), (Ib) and (II) which are suitable for use according to the invention are to be mentioned as non-limiting examples illustrating the invention:

a) 47% N,N-dimethylethanolamine, 53% 2,4-pentanedione
b) 50% N,N-dimethylethanolamine, 50% 2,4-pentanedione
c) 68% N,N-dimethylaminododecane, 32% 2,4-pentanedione
d) 50% hexadecylamine, 50% 2,4-pentanedione
e) 50% cyclohexylamine, 50% 2,4-pentanedione
f) 64% dicyclohexylamine, 36% 2,4-pentanedione
g) 76% N-methyl-didecylamine, 24% 2,4-pentanedione
h) 68% hexadecylamine, 32% 2,5-hexanedione
i) 41% ethylenediamine, 59% 2,3-butanedione
j) 77% N-methyl-didecylamine, 23% dihydroxyacetic acid
k) 50% N,N-dimethylethanolamine, 50% dihydroxyacetic acid
l) 63% N,N-dimethylethanolamine, 37% malonic acid
m) 75% N-methyl-didecylamine, 25% malonic acid

EXAMPLES OF ANTI-SKINNING AGENTS ACCORDING TO THE INVENTION

1. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.28 g of the mixture indicated under a) is added to the formulation, and the time taken for a skin to form on the surface of a closed, approximately half-full 125 ml PE beaker is determined. Skin formation was prevented for 63 days. By comparison, the skinning time, determined under identical conditions, of a sample without anti-skinning additive was 8 days, and that of a sample containing a conventional, suitable amount of butanoneoxime (0.1 g) was 23 days. The drying time of a corresponding lacquer film (100 µm wet film layer thickness) of the mixture according to the invention was 3 hours 40 minutes (needle track drying in accordance with test specification 100-94 of Borchers GmbH). The drying time, determined under identical conditions, of a lacquer film without anti-skinning additive was 3 hours 50 minutes, and that of a sample containing a conventional, suitable amount (0.1 g) of butanoneoxime was determined as 8 hours. The pendulum hardness according to König (determined in accordance with DIN 53 157) of the above-mentioned films was 21 seconds after a storage time of one week for all three samples.

2. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.23 g of the mixture indicated under g) is added to the formulation, and the time taken for a skin to form on the surface of a closed, approximately half-full 125 ml PE beaker is determined. Skin formation was prevented for more than 60 days. By comparison, the skinning time, determined under identical conditions, of a sample without anti-skinning additive was 5 days, and that of a sample containing a conventional, suitable amount of butanoneoxime (0.1 g) was 52 days. The drying time of a corresponding lacquer film (100 µm wet film layer thickness) of the mixture according to the invention was 2 hours 50 minutes (needle track drying in accordance with test specification 100-94 of Borchers GmbH). The drying time, determined under identical conditions, of a sample without anti-skinning additive was 3 hours 30 minutes, and that of a sample containing a conventional, suitable amount (0.1 g) of butanoneoxime was determined as 4 hours.

3. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.44 g of the mixture indicated under e) is added to the formulation, and the time taken for a skin to form on the surface of a closed, approximately half-full 125 ml PE beaker is determined. Skin formation was prevented for 104 days. By comparison, the skinning time, determined under identical conditions, of a sample without anti-skinning additive was 8 days, and that of a sample containing a conventional, suitable amount of butanoneoxime (0.1 g) was 23 days. The drying time of a corresponding lacquer film (100 μm wet film layer thickness) of the mixture according to the invention was 3 hours 35 minutes (needle track drying in accordance with test specification 100-94 of Borchers GmbH). The drying time, determined under identical conditions, of a sample without anti-skinning additive was 3 hours 50 minutes, and that of a sample containing a conventional, suitable amount of butanoneoxime (0.1 g) was determined as 8 hours. The pendulum hardness according to König (determined in accordance with DIN 53 157) of a lacquer film to which the mixture according to the invention had been added was 23 seconds after a storage time of one week. By comparison, the pendulum hardness, determined under identical conditions, of the above-mentioned lacquer films without anti-skinning additive or with butanoneoxime was in each case 21 seconds after a storage time of one week.

4. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.26 g of the mixture indicated under h) is added to the formulation, and the time taken for a skin to form on the surface of a closed, approximately half-full 125 ml PE beaker is determined. Skin formation was prevented for more than 25 days. The drying time of a corresponding lacquer film (100 μm wet film layer thickness) of the mixture according to the invention was 5 hours 30 minutes (needle track drying in accordance with test specification 100-94 of Borchers GmbH). By comparison, the skinning time, determined under identical conditions, of a sample without anti-skinning additive was 4 days. The drying time, determined under identical conditions, of a sample without anti-skinning additive was 5 hours.

5. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.05 g of the mixture indicated under i) is added to the formulation, and the time taken for a skin to form on the surface of a closed, approximately half-full 125 ml PE beaker is determined. Skin formation was prevented for more than 25 days. By comparison, the skinning time, determined under identical conditions, of a sample without anti-skinning additive was 6 days, and that of a sample containing a conventional, suitable amount (0.1 g) of butanoneoxime was 17 days. The drying time of a corresponding lacquer film (100 μm wet film layer thickness) of the mixture according to the invention was 4 hours (needle track drying in accordance with test specification 100-94 of Borchers GmbH). The drying time, determined under identical conditions, of a sample without anti-skinning additive was 5 hours, and that of a sample containing a conventional, suitable amount of butanoneoxime (0.1 g) was determined as 4 hours 30 minutes. The pendulum hardness according to König (determined in accordance with DIN 53 157) of the lacquer film to which the mixture according to the invention had been added was 35 seconds after a storage time of one week. By comparison, the pendulum hardness, determined under identical conditions, of the lacquer film without anti-skinning additive was 33 seconds after a storage time of one week.

6. To a lacquer formulation consisting of 40.0 g of a long-oil alkyd resin (Alkydal F 681® from Bayer AG), 4.0 g of white spirit D 60, 4.0 g of xylene, 1.0 g of n-butanol there are added 0.18 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.26 g of the mixture indicated under k) is added to the formulation, and the time taken for a skin to form on the surface of a closed, approximately half-full 125 ml PE beaker is determined. Skin formation was prevented for 70 days. By comparison, the skinning time, determined under identical conditions, of a sample without anti-skinning additive was 5 days, and that of a sample containing a conventional, suitable amount of butanoneoxime (0.1 g) was 36 days. The drying time of a corresponding lacquer film (100 μm wet film layer thickness) of the mixture according to the invention was 2 hours (needle track drying in accordance with test specification 100-94 of Borchers GmbH). The drying time, determined under identical conditions, of a sample without anti-skinning additive was 2 hours 50 minutes, and that of a sample containing a conventional, suitable amount (0.1 g) of butanoneoxime was determined as 2 hours 30 minutes.

7. To a lacquer formulation consisting of 41.0 g of a medium-oil alkyd resin (Alkydal F 48® from Bayer AG), 4.0 g of white spirit D 60, 4.0 g of xylene, 1.0 g of n-butanol there are added 0.08 g of a cobalt-containing siccative (Trockner 69® from Borchers GmbH, contains 6 wt. % Co) and 0.4 g of a calcium-containing siccative (Octa-Soligen Calcium 10® from Borchers GmbH, contains 10 wt. % calcium). 0.18 g of the mixture indicated under 1) is added to the formulation, and the time taken for a skin to form on the surface of a closed, approximately half-full 125 ml PE beaker is determined. Skin formation was prevented for 52 days. By comparison, the skinning time, determined under identical conditions, of a sample without anti-skinning additive was 7 days.

What is claimed is:

1. A coating composition comprising an oxidatively drying binder and, as an anti-skinning agent, a mixture of A) an aliphatic amine corresponding to formula (Ia) end/or its salts corresponding to formula (Ib):

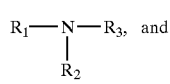

(Ia)

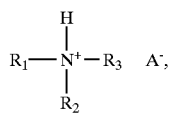

(Ib)

wherein $R_1$, $R_2$ and $R_3$ each independently of the others represents hydrogen H); a linear or branched $C_1$–$C_{20}$-alkyl radical which is optionally unsaturated or which is optionally mono- or poly-substituted by a hydroxyl radical, an alkoxy radical, an amine radical corresponding to the formula $N(R_1)(R_2)$, or a $C_5$–$C_7$-cycloalkyl radical, and $A^-$ represents a halide, sulfate, acetate or butyrate salt-forming anion, and B) a compound corresponding to formula (II)

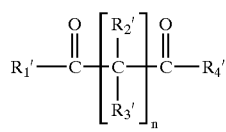

(II)

wherein $R_1$, and $R_4$, each independently of the other represents hydrogen (H), a $C_1$–$C_4$-alkyl radical, or a $C_5$-$C_7$cycloalkyl radical, a hydroxyl radical or a $C_1$–$C_4$-alkoxy radical, —O⁻ (oxygen anion), $R_2$, represents H, a $C_1$–$C_4$-alkyl radical, or A (anion), $R_3$, represents H, a $C_1$–$C_4$-alkyl radical, and n represents 0, 1 or 2.

2. The coating composition of claim 1 wherein $A^-$ represents chloride, bromide, iodide, ½ sulfate.

3. The coating composition of claim 1 wherein the salt-forming anions A form in situ from the constituents of the mixture.

4. The coating composition of claim 1 wherein the compounds of formulas (Ia), (Ib) and (II) are used in the absence of solvents or are dissolved in solvents.

5. The coating composition of claim 1 wherein the compounds of formulas (I a), (Ib) and (II) are dissolved in water.

6. The coating composition of claim 1 wherein the compounds of formulas (I a), (Ib) and (II) are used in the form of an aqueous dispersion.

7. The coating composition of claim 1 wherein said mixture is present in an amount at 0.05 to 2 wt. %, based on the weigh of the coating composition.

* * * * *